United States Patent [19]

Fujiguchi et al.

[11] Patent Number: 5,395,889
[45] Date of Patent: Mar. 7, 1995

[54] LOW-GLOSS THERMOPLASTIC RESIN COMPOSITIONS

[75] Inventors: Tomohide Fujiguchi; Hideyuki Itoi; Akihiro Saito, all of Utsunomiya, Japan

[73] Assignee: GE Plastics Japan, Tokyo, Japan

[21] Appl. No.: 149,159

[22] Filed: Nov. 8, 1993

Related U.S. Application Data

[63] Continuation of Ser. No. 947,368, Sep. 18, 1992, abandoned.

[30] Foreign Application Priority Data

Dec. 27, 1991 [JP] Japan .................................. 3-360387

[51] Int. Cl.$^6$ .......................... C08L 69/00; C08K 5/51; C08K 5/09
[52] U.S. Cl. .................... 525/148; 523/451; 523/453; 523/455; 523/461; 524/112; 524/320; 524/414; 524/508
[58] Field of Search .............. 523/451, 455, 453, 461; 524/112, 320, 414, 508, 611; 525/148

[56] References Cited

U.S. PATENT DOCUMENTS

| | | | |
|---|---|---|---|
| 3,761,440 | 9/1973 | Margotte | 525/148 |
| 3,951,903 | 4/1976 | Shaffer. | |
| 4,254,015 | 3/1981 | Thomas | 524/611 |
| 4,533,690 | 8/1985 | Rosenquist | 524/611 |
| 4,868,244 | 9/1989 | Boutni | 525/67 |
| 5,055,523 | 10/1991 | Inoue | 525/67 |

FOREIGN PATENT DOCUMENTS 291948 11/1988 Japan .................................. 525/148

OTHER PUBLICATIONS

Patent Abstract of Japan, vol. 10, No. 78 (C-335)(2135) 27 Mar. 1986.
Patent Abstract of Japan, vol. 15, No. 467 (C-888)(4995) 27 Nov. 1991.
Chemical Abstracts, vol. 115, No. 16, 21 Oct. 1991, Columbus, Ohio, US; abstract No. 160585r.

*Primary Examiner*—David Buttner

[57] ABSTRACT

Glycidyl (meth)-acrylate polymer and an organic acid, phosphoric acid, phosphorous acid, hypophosphoric acid and/or a compound other than an organic acid containing one or more functional groups selected from among carboxyl, amino, hydroxyl, acid anhydride and thiol groups added to an aromatic polycarbonate resin composition, decrease the luster of the composition without compromising the properties of the composition.

5 Claims, No Drawings

LOW-GLOSS THERMOPLASTIC RESIN COMPOSITIONS

This is a continuation of application, Ser. No. 07/947,368, filed on Sep. 18, 1992, now abandoned.

DETAILED DESCRIPTION OF THE INVENTION

Industrial Field of Use

The present invention relates to aromatic polycarbonate resin compositions, and more specifically to aromatic polycarbonate resin compositions having a low gloss and also an excellent mechanical strength and weatherability.

DESCRIPTION OF THE PRIOR ART, AND PROBLEMS THEREWITH

Aromatic polycarbonates are widely used because of their excellent mechanical strength, weatherability, light stability and heat resistance. However, molded pieces made of these often have luster. Having a luster is desirable in a number of applications. However, a delustered or non-glossy surface is often desirable in products such as computer terminal housings, typewriters, various electric appliances and certain kinds of automotive components.

The removal of luster by surface embossing requires a separate step, which increases costs. Moreover, there is a possibility that the surface that has been delustered by embossing will vanish due to subsequent wear, leading to the reappearance of a luster. The addition of delustering agents such as finely divided silica, silicates, alumina and other mineral fillers often has an adverse influence on such physical characteristics as the impact strength. Efforts to add polymer-based delustering agents frequently have an adverse influence not only on the impact strength, but also on other important characteristics such as the heat distortion temperature, weatherability and light stability.

Compositions in which butadiene rubber polymers and other components are blended are known from Japanese Published Unexamined Patent Applications [Kokai] Nos. 59-193,950 (1984), 60-20,955 (1985), 61-174,257 (1986) and 63-156,851 (1988) as aromatic polycarbonate resin compositions having low luster and excellent mechanical strength and heat resistance. However, polycarbonate resin compositions which contain butadiene rubber polymers exhibit inadequate weatherability, and so are not suited to applications that require high weatherability. Hence, in prior-art polycarbonate resin compositions, it has been difficult to achieve excellent mechanical properties, excellent weatherability and low luster at the same time.

The object of this invention is to provide low-gloss polycarbonate resin compositions that have excellent mechanical properties and weatherability.

Means for Resolving the Problems

The inventors discovered that when glycidyl (meth)acrylate polymer and an organic acid, phosphoric acid, phosphorous acid, hypophosphoric acid and/or a compound other than an organic acid containing one or more functional groups selected from among carboxyl, amino, hydroxyl, acid anhydride and thiol groups is added to the aromatic polycarbonate resin composition, the luster can be decreased without compromising the properties of the aromatic polycarbonate resin composition.

That is, the present invention is a thermoplastic resin composition containing:
(A) 100 parts by weight of:
  (1) 99–70 wt % of polycarbonate resin, and
  (2) 1–30 wt % of an addition polymer containing units derived from glycidyl (meth)acrylate, and
(B) 0.001-1 part by weight of a compound such as an organic acid, phosphoric acid, phosphorous acid, hypophosphoric acid and/or a compound other than an organic acid that has one or more functional groups selected from among carboxyl, amino, hydroxyl, acid anhydride and thiol groups.

The use of above component (B) here is an important component of the present invention. By using this component, the luster of the resin composition can be greatly decreased. This was entirely unexpected.

The polycarbonate resin which serves as component (A-1) in the present invention is an aromatic polycarbonate that has been prepared by a known phosgene process or a melt process (e.g., see Kokai Nos. 63-215,763 (1988) and 2-124,934 (1990)). The polycarbonate resin consists of a carbonate component and diphenol component. Phosgene, diphenyl carbonate and the like may be cited as examples of precursors for introducing carbonate components. Examples of suitable diphenols that may be cited include 2,2-bis(4-hydroxyphenyl)propane (e.g., bisphenol A), 2,2-bis(3,5-dibromo-4-hydroxyphenyl)propane, 2,2-bis (3,5-dimethyl-4-bydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)decane, 1,4-bis(4-hydroxyphenyl)propane, 1,1-bis(4-hydroxyphenyl)cycloclodscans, 1,1-bis(3,5-dimethyl-4-hydroxyphenyl)cyclododecane, 4,4-dihydroxydiphenyl ether, 4,4-thiodiphenol, 4,4-dihydroxy-3,3-dichlorodiphenyl ether and 4,4-dihydroxy-2,5-dihydroxydiphenyl ether. These can be used alone or as combinations. In addition, it is also possible to use compounds having three or more phenolic hydroxyl groups.

Next, there is component (A-2) used in the present invention. In this invention, the addition polymer containing units derived from glycidyl (meth)acrylate that serves as component (A-2) encompasses all polymers that contain units derived from glycidyl (meth)acrylate; aside from homopolymers of glycidyl methacrylate (GNA) or glycidyl acrylate, and copolymers of both, these may also be copolymers with other monomers. When component (A-2) is a copolymer, it is preferable that this copolymer contain at least 10 wt % of units derived from glycidyl (meth)acrylate, and it is even more preferable that these be copolymers or terpolymers with compounds selected from among aromatic vinyl compounds such as styrene, vinyl cyanide compounds such as acrylonitrile, unsaturated carboxylic acids such as (math)acrylic acid, or their alkyl esters such as methyl methacrylate or methyl acrylate. It is even more preferable that GMA-styrene copolymers and GMA-styrene-acrylonttrile copolymers be used as component (A-2). These components (A-2) are compounded in an amount of 1–30 wt % with respect to 99–70 wt % of component (A-1), and preferably in an amount of 3–15 wt % with respect to 97–85 wt % of component (A-1). When the amount of component (A-2) is less than 1 wt %, the luster does not decrease by very much; on the other hand, when this is more than 30 wt %, the mechanical strength of the composition decreases.

The compound used as component (B) is an organic acid, phosphoric acid, phosphorous acid, hypophosphoric acid or a compound other than an organic acid containing at least one functional group selected from among carboxyl, amino, hydroxyl, acid anhydride and thiol groups. Any one or combinations of two or more of these compounds may be used. There is no particular restriction on the organic acids used here, it being possible to use various known organic acids. Examples of these include, but are not limited to, the following: carboxylic acids such as acetic acid, propionic acid, malonic acid, succinic acid, stearic acid, maleic acid, fumaric acid, itaconic acid, citric acid, benzoic acid, phthalic acid, isophthalic acid and terephthalic acid; sulfonic acids such as benzenesulfonic acid and toluenesulfonic acid. These organic acids may also contain other functional groups such as amino, hydroxyl, acid anhydride and thiol groups. Phosphoric acid, phosphorous acid and hypophosphoric acid are all well known and do not require further explanation here. The compound containing one or more functional group selected from among carboxyl, amino, hydroxyl, acid anhydride and thiol groups may contain two or more of these functional groups, in which case the two or more functional groups may be the same or different groups. These compounds may also contain other functional groups. Examples that may be cited of these compounds include, but are not limited to, diethylenetriamine, m-phenylenediamine, m-phenylenediamine, hexamethylenediamine. hydroxyethyl methacrylate, maleic anhydride, phthalic anhydride, hexahydrophthalic anhydride, pyromellitic anhydride, dodecylsuccinic anhydride, ethanethiol and phenylthiol. Component (B) is included in the resin composition of the present invention in an amount of 0.001-1 part by weight, and preferably 0.01-0.5 part by weight, per 100 parts by weight of component (A) (that is, the sum of components (A-1) and (A-2)). When the amount of component (B) is less than 0.001 part by weight, the luster of the composition is not sufficiently reduced; when this exceeds 1 part by weight, declines occur in such properties of the composition as the mechanical strength and heat resistance.

In addition, other resins, and especially rubbery substances, as well as conventional additives such as pigments, dyes, reinforcing agents, fillers, heat resisting agents, antioxidants, anti-weathering agents, lubricants, parting agents, crystal nucleating agents, plasticizers, flowability enhancers, and antistatic agents may be added when the resin is mixed or during molding, provided that doing so does not mar the properties of the resin compositions of the present invention.

The reinforcing fillers may be selected from among finely-ground aluminum, iron, nickel or the like, metal oxides, non-metals such as carbon filament, silicates such as mica and aluminum silicate (clay), talc, asbestos, titanium dioxide, wollastonite, novaculite, potassium titanate and titanate whiskers, glass flakes, glass beads, glass fibers end polymer fibers.

The reinforcing fillers may be used in an amount capable of exhibiting reinforcing effects, this normally being 1-60 wt %, and preferably 5-50 wt %, of the composition. The preferable reinforcing material is glass.

In cases where the composition of the present invention includes a polycarbonate consisting of brominated bisphenol, an inorganic or organic antimony compound can also be formulated into the composition of the present invention in order to synergistically increase the flame retardancy achieved in this way.

Hindered phenols, phosphites, metal phosphates, and metal hypophosphites can be admixed as stabilizers and antioxidants.

When producing the resin compositions of the present invention, various components can be mixed by means of a method known to the prior art. For example, suitable use can be made of a melt kneading process using an extruder, a Banbury mixer, or rollers following dispersion and mixing of the various components in a high-speed mixer such as a tumbling mixer or Henschel mixer, ribbon blender or super mixer.

EXAMPLES

The following were used as the components in the examples of the invention and the comparative examples described below.

Component (A-1):

Aromatic polycarbonate: Lexan 141 (trademark, General Electric Co.; prepared from bisphenol A and phosgene; intrinsic viscosity at 25° C. in methylene chloride, 0.51 dL/g)

Component (A-2):

G-1005SA (trademark, Nippon Oil & Fats Co.; 5 wt % GMA-containing styrene-acrylonitrile copolymer)

G-1005S (trademark, Nippon Oil & Fats Co.; 5 wt % GMA-containing styrene copolymer)

Component B

Citric acid
Hypophosphoric acid
Maleic anhydride
Other Components (used in comparative examples):
ABS resins: "Bretex", 301 [tradename, Borg-Warner Chemical; a powdered ABS copolymer (rubber content, 34%) containing about 24% of acrylonitrile monomer units, 34% of butadiene monomer units and 42% of styrene monomer units2 most likely produced essentially by the emulsion polymerizatlon process cited in U.S. Pat. No. 3,238,275].

* Translator's Note: Spelling is phonetic.

EXAMPLES 1-6, COMPARATIVE EXAMPLES 1-5

The components in the proportions (weight ratios) indicated in Table I were melt-kneaded in a 50-mm twin-screw extruder at a kneading temperature of 260° C. and a rotational speed of 290 rpm, and pellets formed. Using these pellets, molded pieces were fabricated at a temperature setting of 260° C. and a mold temperature of 60° C., and the physical properties were measured in general accordance with the following criteria.

Notched Izod impact strength—ASTM D256
Tensile strength and tensile elongation—ASTM D638
Flexural strength and flexural modulus—ASTM D790

The results are presented in Table 1.

The surface gloss of the molded pieces (50×50×3 mm square sheets) was measured using a digital variedangle glossmeter (UGV-40, made by Suga Shikenki KK). Those results are also given in Table 1.

In addition, using a weatherometer (model Ci35 made by Atlas Co.), molded pieces (50×50×3 mm square sheets; fabricated in the same manner as the molded pieces used in the measurement of gloss) that had been colored gray were irradiated with a xenon arc lamp having a radiation wavelength of 340 nm and a radiation illuminance of 0.39 W/m² at a black panel temperature of 63° C. and a humidity of 50%. After this, the initial hue and the color difference (E) were measured using a spectrophotometer (model CA35, made by Murakami Shikisai Gijutsu Kenkyujo). The results are presented in Table 1.

Advantages of the Invention

The present invention provides aromatic polycarbonate resin compositions having a sufficiently low luster as well as excellent mechanical strength and weatherability.

succinic acid, stearic acid, maleic acid, fumaric acid, itaconic acid, citric acid, benzoic acid, phthalic acid, isophthalic acid, terephthalic acid, benzenesulfonic acid, toluenesulfonic acid, each of the foregoing being unsubstituted or substituted with other functional groups selected from the group consisting of amino, hydroxyl, acid anhydride and thiol, phosphoric acid, phosphorous acid, hypophosphoric acid, diethylenetriamine, m-phenylenediamine, m-phenylenediamine, hexamethylenediamine, hydroxyethyl methacrylate, maleic anhydride, phthalic anhydride, hexahydrophthalic anhydride, pyromellitic anhydride, dodecylsuccinic anhydride, ethanethiol or phenylthiol.

2. The resin of claim 1 wherein the glycidyl (meth)acrylate polymer is an addition polymer containing units derived from glycidyl (meth)acrylate.

3. The resin of claim 1 wherein the component of (C) is citric acid.

4. The resin of claim 1 wherein the component of (C) is hypophosphoric acid.

5. The resin of claim 1 wherein the component of (C) is maleic anhydride.

TABLE 1

| | Exam. 1 | Exam. 2 | Exam. 3 | Exam. 4 | Exam. 5 | Exam. 6 | Comp. Ex. 1 | Comp. Ex. 2 | Comp. Ex. 3 | Comp. Ex. 4 | Comp. Ex. 5 |
|---|---|---|---|---|---|---|---|---|---|---|---|
| Composition | | | | | | | | | | | |
| (A-1) Polycarbonate | 90 | 90 | 90 | 90 | 90 | 90 | 100 | 90 | 90 | 80 | 80 |
| ABS | | | | | | | | | | 10 | 10 |
| (A-2) G-1005SA | 10 | 10 | 10 | | | | | 10 | | 10 | |
| (A-2) G-1005S | | | | 10 | 10 | 10 | | | 10 | | 10 |
| (B) Citric acid | 0.1 | | | 0.1 | | | | | | | |
| (B) Hypophosphoric acid | | 0.1 | | | 0.1 | | | | | | |
| (B) Maleic anhydride | | | 0.1 | | | 0.1 | | | | | |
| Properties | | | | | | | | | | | |
| 60° gloss (%) | 28 | 26 | 23 | 29 | 34 | 31 | 95 | 75 | 72 | 20 | 21 |
| ⅛" notched Izod impact strength (kg · cm/cm) | 70 | 65 | 72 | 61 | 64 | 64 | 88 | 68 | 70 | 66 | 64 |
| Tensile strength (kg/cm²) | 620 | 640 | 653 | 637 | 640 | 632 | 670 | 622 | 635 | 610 | 620 |
| Tensile elongation (%) | 182 | 185 | 192 | 168 | 170 | 181 | 220 | 170 | 165 | 170 | 152 |
| Flexural strength (kg/cm²) | 1010 | 1020 | 980 | 1050 | 1030 | 990 | 1100 | 1030 | 1030 | 960 | 970 |
| Flexural modulus (kg/cm²) | 23,900 | 24,300 | 22,200 | 25,300 | 24,200 | 24,800 | 25,000 | 22,300 | 23,100 | 23,200 | 23,400 |
| Color difference value (ΔE) | 3.8 | 3.9 | 3.8 | 4.0 | 4.1 | 3.8 | 3.5 | 4.0 | 3.9 | 7.3 | 7.5 |

We claim:

1. A thermoplastic resin comprising 100 parts by weight of a component comprising 99 to 70 weight percent of a polycarbonate, and 1 to 30 weight percent of a glycidyl (meth)acrylate polymer, and
   0.0001 to 1 part by weight of a component selected from acetic acid, propionic acid, malonic acid,